US006437291B1

(12) United States Patent
Hopponen

(10) Patent No.: US 6,437,291 B1
(45) Date of Patent: Aug. 20, 2002

(54) CONVERTIBLE ROTISSERIE AND GRILL

(75) Inventor: James L. Hopponen, Brookfield, CT (US)

(73) Assignee: Uni-Splendor Corp. (TW)

( * ) Notice: Subject to any disclaimer, the term of this patent is extended or adjusted under 35 U.S.C. 154(b) by 0 days.

(21) Appl. No.: 09/479,348

(22) Filed: Jan. 7, 2000

Related U.S. Application Data

(60) Provisional application No. 60/115,264, filed on Jan. 8, 1999.

(51) Int. Cl.[7] .................................................. A21B 1/02
(52) U.S. Cl. ........................ 219/395; 219/386; 219/403; 99/340; 426/523
(58) Field of Search ................................. 219/395, 403, 219/386, 404; 99/340, 339, 341, 421 H, 446, 450; 426/523, 466

(56) References Cited

U.S. PATENT DOCUMENTS

| | | | | | |
|---|---|---|---|---|---|
| 5,536,518 A | * | 7/1996 | Rummel | ...................... | 426/523 |
| 5,934,180 A | * | 8/1999 | Lin | .............................. | 99/340 |
| D423,280 S | * | 4/2000 | Lin | .............................. | D7/337 |

\* cited by examiner

Primary Examiner—Teresa Walberg
Assistant Examiner—Shawntina Fuqua
(74) Attorney, Agent, or Firm—Dilworth & Barrese, LLP

(57) ABSTRACT

A convertible rotisserie and grill which includes a housing having a first mechanical interface for removably receiving a grill plate and second mechanical interface for removably receiving a spit. The convertible rotisserie and grill also includes a first heating element for heating the grill plate for grill-style cooking and a second heating element for heating an area in close proximity to the spit for rotisserie-style cooking. A probe activates and controls the temperature of one of the heating elements depending upon the desired cooking style.

18 Claims, 7 Drawing Sheets

CONVERTIBLE ROTISSERIE AND GRILL

This application claims the benefit of provisional application Ser. No. 60/115,264 filed on Jan. 8, 1999 entitled "CONVERTIBLE ROTISSERIE AND GRILL".

BACKGROUND

1. Field of the Disclosure

The present disclosure relates to barbecues and more particularly to a convertible rotisserie and grill which includes separate heating elements for grill-style cooking and rotisserie-style cooking.

2. Description of the Related Art

Outdoor charcoal or gas barbecuing is a popular method of cooking and preparing various foods such as meats, poultry, fish and vegetables and manufacturers have enjoyed great commercial success providing outdoor barbecues and accessories in the United States and elsewhere. Part of the popularity of outdoor barbecuing can be attributed to the unique blend of smell, flavor and look the briquettes convey to the meat, fish, and/or vegetables which is often referred to as "barbecue" or "charcoal" flavor. However, due to the obvious safety concerns of burning briquettes indoors, barbecuing has typically been recognized as an outdoor cooking activity.

Recently, however, manufacturers have been looking for ways to manufacture grills for barbecuing indoors which imitate the various cooking advantages of outdoor barbecues, e.g., the smell, taste and look of barbecued food. For example, electric indoor barbecues provide one method of safely barbecuing indoors and some of these designs include electric hotplates with grill-like surfaces for conveying a grill-like look to the food and for allowing the fat/grease to drip from the food onto the heating element to flavor the food. Other designs include rotisserie units for rotating a spit for cooking meat and vegetables. Unfortunately due to the convenience of other cooking methods and appliances such as ovens and stoves which offer a wider range of cooking options, e.g., baking, broiling, frying, etc., indoor electric barbecuing is not commonplace.

As a result, some barbecue manufacturers have attempted to design indoor barbecue units with dual cooking capacities, e.g., grilling and rotisserie-style cooking. For example, U.S. Pat. No. 5,536,518 to Rummel, provides a convertible grill and rotisserie barbecue which includes a briquette tray which can be angled to effect rotisserie-style cooking. U.S. Pat. No. 4,663,517 to Huff et al. includes an electric barbecue having a heating element dimensioned to fit within a bowl-like cooking structure which is movable from a horizontal position for grill-style cooking to an angled position for rotisserie-style cooking. U.S. Pat. No. 5,649,475 to Murphy et al. includes a universally adaptable rotisserie assembly which can be used to support a rotating spit for grilling meat and vegetables.

However, for the most part and by and large, these units are overly complicated and/or include heating elements which must be moved to change the cooking style. Further, many of these heating elements should not be moved during cooking (or shortly thereafter) and/or have parts which are subject to breakage. Thus, there exists a need to develop a convertible grill and rotisserie barbecue which includes separate heating elements for grill-style and rotisserie-style cooking which is not overly complicated in design and which is readily convertible from one cooking style to another without having to move the heating element.

SUMMARY

The present disclosure relates to a convertible rotisserie and grill which includes a base or housing having a first mechanical interface for removably receiving a grill plate and second mechanical interface for removably receiving a rotisserie spit. The convertible rotisserie and grill also includes a first heating element for heating the grill plate for grilling meat, fish and vegetables and a second heating element for heating an area in close proximity to the spit for rotisserie-style cooking. A probe activates and controls the temperature of one of the heating elements depending upon the desired cooking style.

In one embodiment, the convertible rotisserie and grill further includes a motor for rotating the spit. Preferably, the motor is speed controlled, i.e., variable speed, and allows a user to selectively control cooking. In another embodiment, the housing includes a step for supporting the motor.

Preferably, the convertible rotisserie and grill includes a multi-positionable cover which removably engages the housing. Advantageously, the cover includes a window for viewing the food during cooking.

In other embodiments, the housing includes a removable drip pan for collecting grease, a pair of recesses for supporting the spit atop the housing and/or a jack which supports the probe for rotisserie-style cooking. The grill plate can also include a jack for supporting the probe for grill-style cooking.

DETAILED DESCRIPTION OF THE PREFERRED EMBODIMENTS

Figure 1:
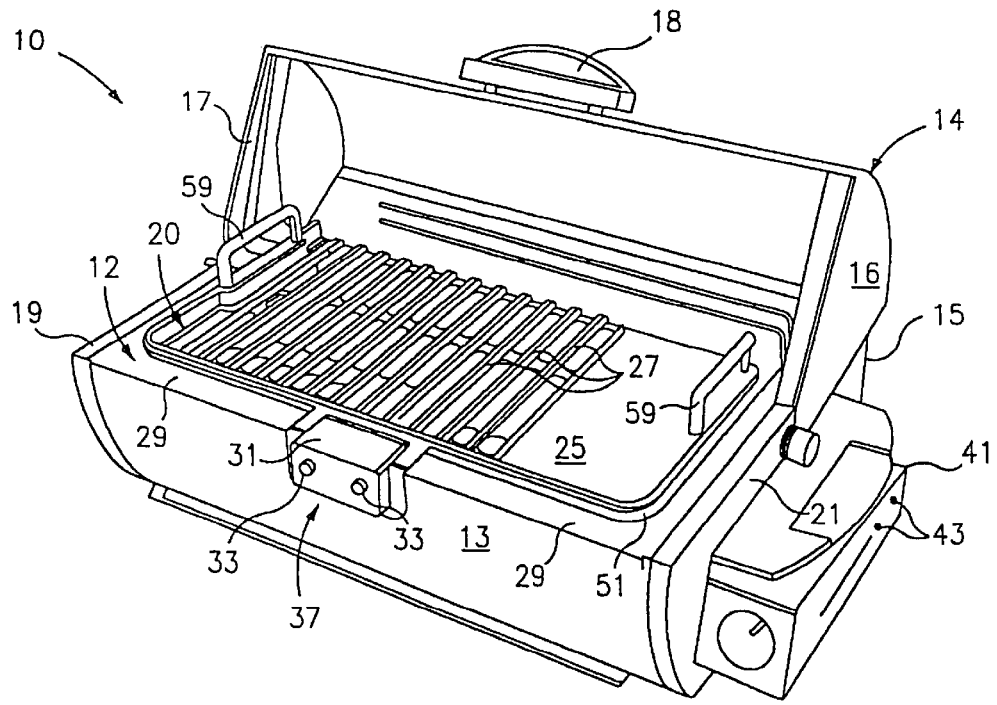
FIG. 1 is a top, perspective view of a convertible rotisserie and grill according to the present disclosure shown in a grilling configuration.
Figure 2:
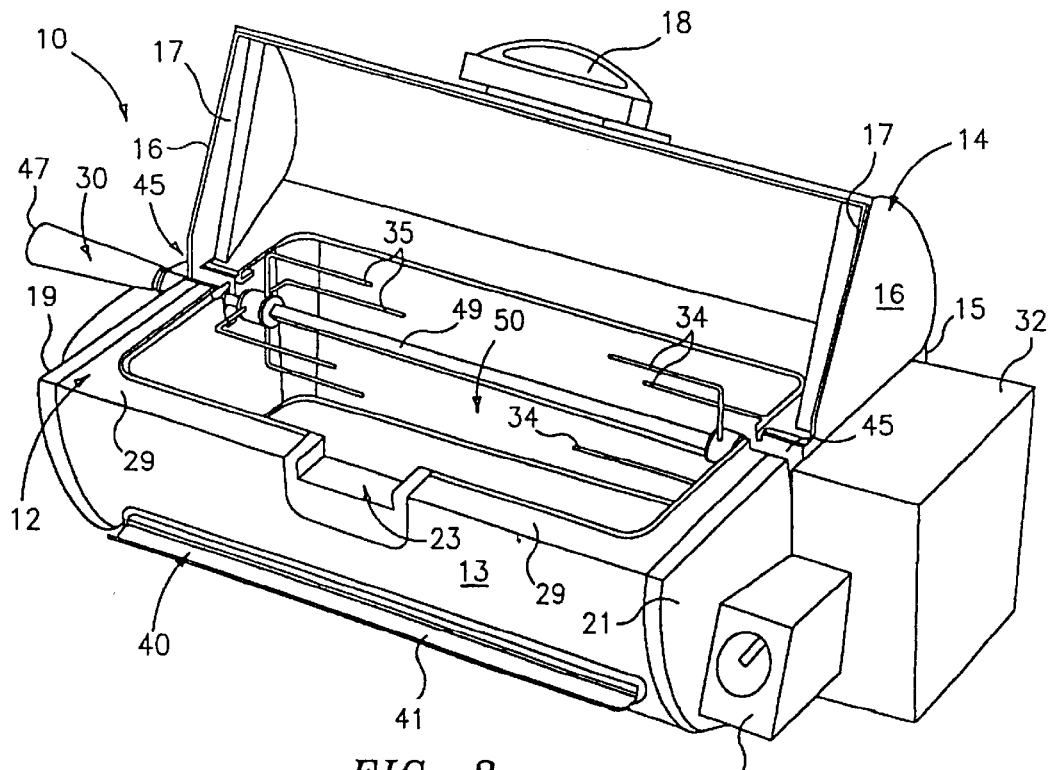
FIG. 2 is a top, perspective view of the convertible rotisserie and grill shown in a rotisserie configuration.
Figure 3:
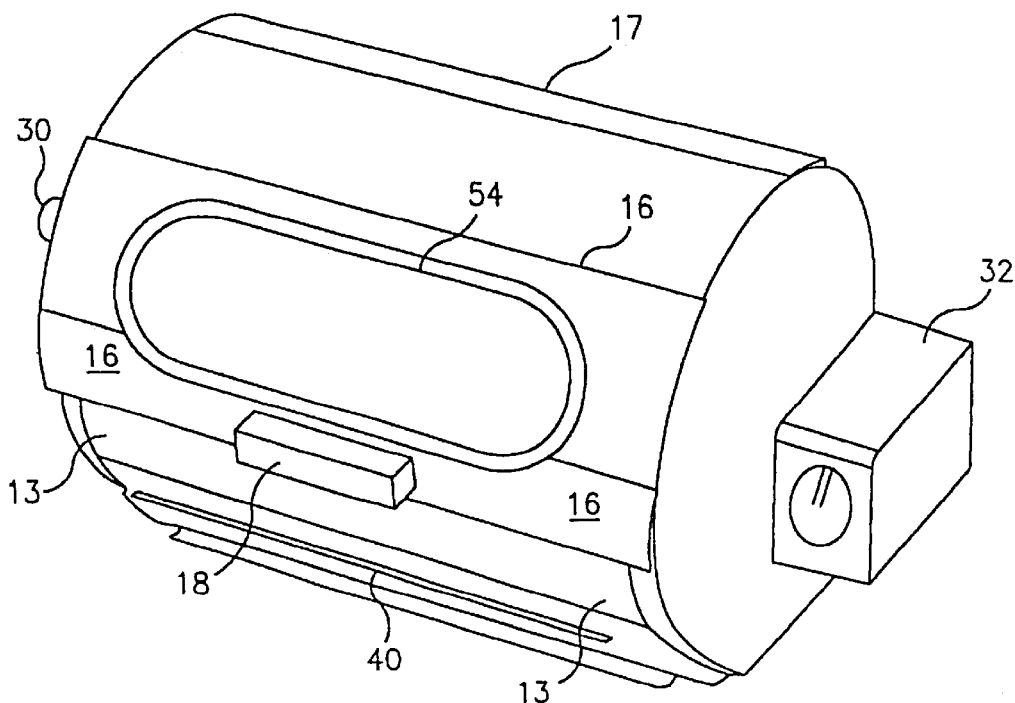
FIG. 3 is a top, perspective view of the convertible rotisserie and grill of FIG. 2 shown with a two-piece cover closed.
Figure 4:
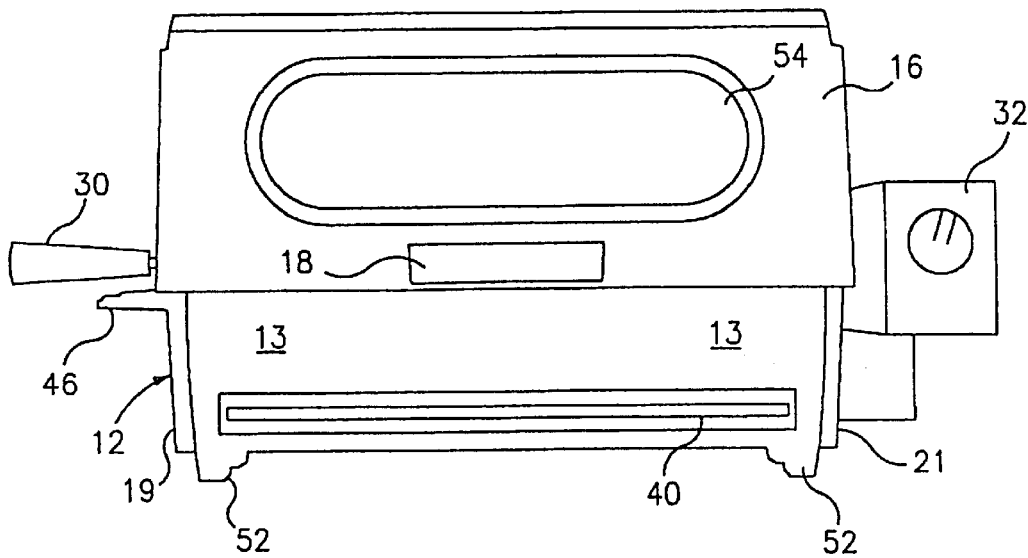
FIG. 4 is front view of the convertible rotisserie and grill of FIG. 2 shown with the two-piece cover closed.

The drawing in which like reference numerals identify similar or identical components throughout several views, there is illustrated a convertible rotisserie and grill in accordance with the principles of the present disclosure. FIG. 1 illustrates the convertible rotisserie and grill assembly in "grilling" configuration while FIG. 2 illustrates the convertible rotisserie and grilling assembly in "rotisserie" configuration. Generally, the assembly is identified by reference numeral 10 and includes a rectilinear barbecue base or housing 12 having a front face 13, a back plate 15, two opposing side plates 19, 21 and a top support surface 29. Preferably, both the front face 13 and the back plate 15 are arcuate for aesthetic purposes and top surface 29 includes an inner lip 51 which defines a generally rectangular aperture 50 for removably seating a resistance heating grill plate 20 used for grill-style cooking.

Figure 8:
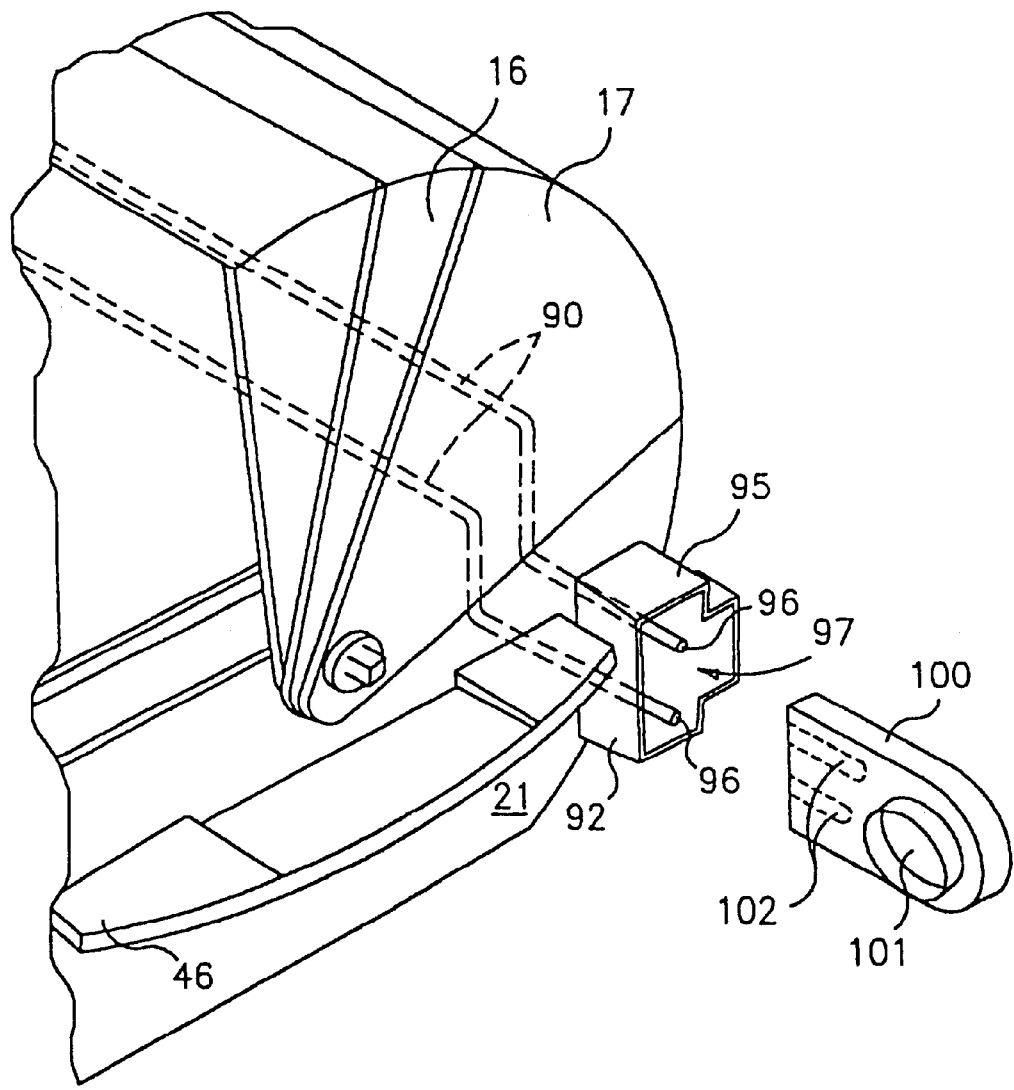
FIG. 8 is a perspective view of a pair of rotisserie heating elements coupled to a rotisserie control housing for receiving a probe type thermostat.
Figure 9:
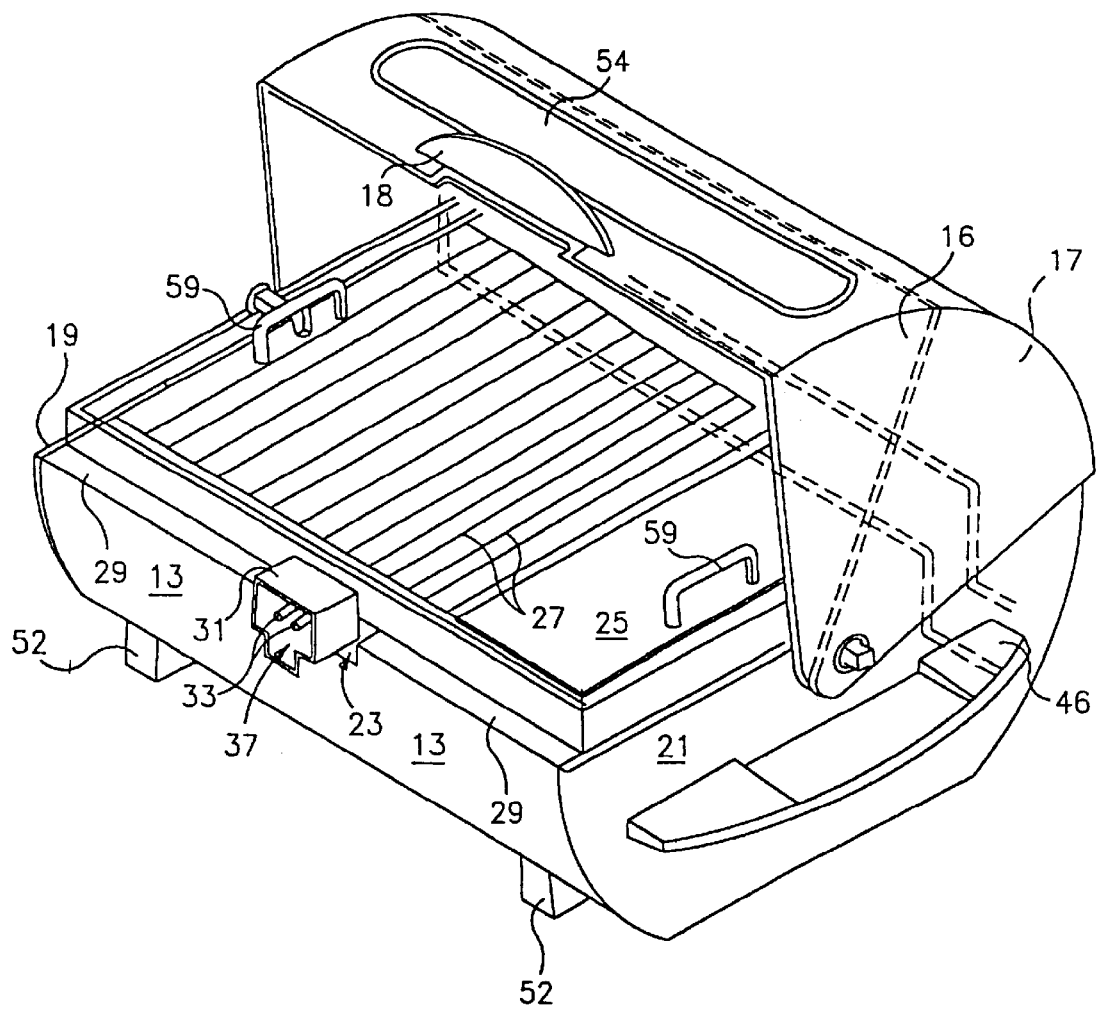
FIG. 9 is a perspective view of a grill control housing for receiving the probe type thermostat.

With reference now to FIG. 1, grill plate 20 is generally rectangular and includes a hot plate cooking surface 25 used for frying meats and vegetables and a plurality of horizontally-disposed racks 27 for grilling/barbecuing. Grill plate 20 preferably incorporates "built-in" resistance coils 67 or the like. It is envisioned that grill plate 20 can be heated by other heating mechanisms means including separate heating coils disposed in close proximity to grill plate 20 (see FIG. 9). As mentioned above, grill plate 20 is seated within aperture 50 and is held fast by lip 51 and can be easily removed using a pair of handles 59 which are preferably located at opposite ends of grill plate 20. Grill plate 20 also includes a jack 31 which mechanically and electrically couples to a temperature control probe 100 (see FIG. 9) for activating and controlling the temperature of the grill plate 20 during cooking. In FIG. 8, temperature control probe 100 is shown prior to connection to the rotisserie. It is envisioned that the same temperature probe 100 can be interchangeably employed with jacks 95 and 31 for either grill-style cooking and/or rotisserie-style cooking. Preferably, housing 12 includes a recess 23 which receives jack 31 upon assembly of grill plate 20 within housing 12.

Jack 31 is generally rectangular and hollow so as to define a socket 37 for snugly receiving probe 100. Preferably, jack 31 includes a pair of prongs 33 which are received within a complimentary pair of apertures 102 defined within probe 100 to mechanically and electrically connect the components (see FIG. 8). While the term socket is used herein, it is contemplated that either a male or female mechanical interface may be used on the probe 100 with a mating mechanical interface disposed on the jack 31. Moreover, it is envisioned that the grill plate 20, recess 50, jack 31 and/or probe 100 can be manufactured with a different shape depending upon a particular purpose, e.g., circular, arcuate and/or generally polygonal.

As best seen in FIGS. 1 and 2, housing 12 also includes a drip pan 40 which is seated below grill plate 20. Preferably, drip pan 40 is removably engageable from housing 12 and is dimensioned to catch food drippings or other splatter during cooking. Drip pan 40 includes a lip or handle 41 to facilitate removal of drip pan 40 from housing 12. Preferably, the drip pan 40 is removed from the front 13 of housing 12, but in some cases it may be preferable to manufacture the housing 12 such that the drip pan 40 can be removed from another location in the housing, i.e., the back plate 15 or sides 19 and 21.

Turning now to FIGS. 2–6 which depict the rotisserie grill 10 in the rotisserie-style cooking configuration, the housing 12 also includes a pair of opposing U-shaped recesses 45 which are defined by sides 46 for supporting a spit 30 used for rotisserie cooking. Preferably, spit 30 includes an elongated rod 49, a handle 47 and a plurality of opposing prongs 34 for securing meat, poultry, fish, vegetables, etc. to the spit 30 for cooking. As best seen in FIG. 7D, a pair of non-conductive U-shaped bushings or posts 80 are disposed in each recess 45. Bushings 80 are envisioned to perform several functions: 1) to support split 30 within recesses 45; 2) to insulate sides 19, 21 and split handle 47 (or 21) from heat during cooking; and 3) to support a rotisserie grill cover 14 which will be described in more detail below. Preferably, a pair of hollow screw caps 81 engage posts 80 at either end to secure cover 14 to housing 12 and also to allow free passage of the split 30 therethrough (or thereon) to engage a motor 32 for rotating split 30. Advantageously, one screw cap 81 can be U-shaped to support the handle side of the split 30 and another screw cap 81 (not shown) can be generally tubular to more securely support and retain the distal end of the split 30.

As mentioned above and as best seen in FIGS. 1, 4, 6, 7A, 8 and 10, a motor rotates spit 30 during rotisserie-style cooking, however, in some cases it may be preferable to rotate the handle manually depending upon a particular purpose. Preferably, motor 32 includes a control knob 57 for governing the rotational speed of the spit 30 during cooking. Housing 12 also includes a motor support 46 which is affixed to at least one side 19 and/or 21 of the housing 12 which has a step portion 58 for securing motor 32 thereon.

A multi-positionable cover 14 attaches to housing 12 and is movable from a first position wherein the cover 14 is open for grill-style cooking to a second closed position for rotisserie roasting. Preferably, the cover 14 can also be positioned in multiple other positions between the first and second cooking positions depending upon a particular purpose, e.g., open rotisserie-style cooking. In the particular embodiment shown in the drawings, the back plate 15 and the two opposing side plates 19 and 21 of the housing 12 extend vertically such that about 60% of the rotisserie grill 10 is enclosed to form a semi-tubular cooking pit within the housing 12 (see FIG. 5). As a result, cover 14 is designed to close about 40% of the cooking pit for roasting and/or steaming purposes.

Figure 7A:
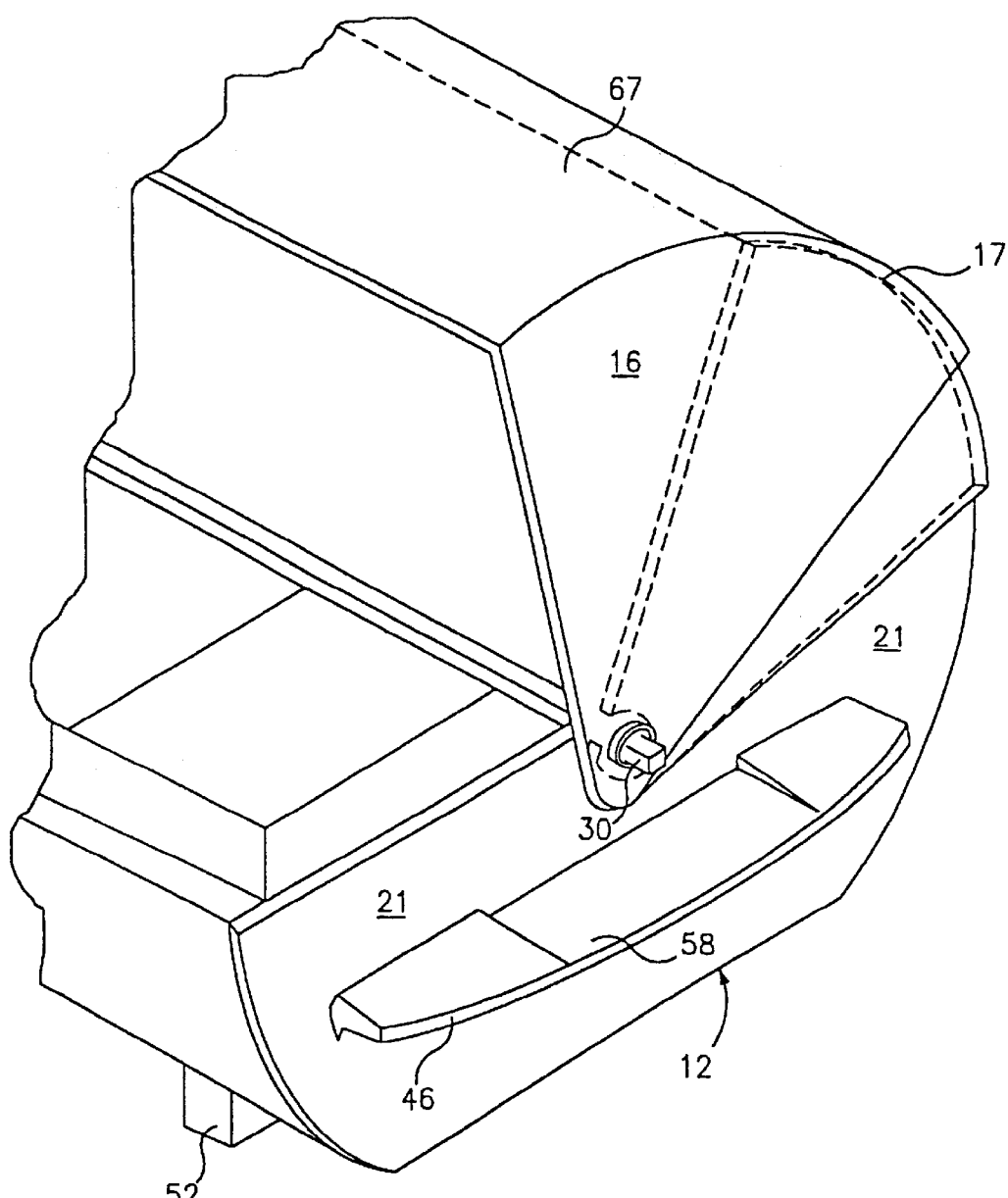
FIG. 7A is a perspective view of the convertible rotisserie and grill of FIG. 2 shown with the two-piece cover partially open.
Figure 7B:
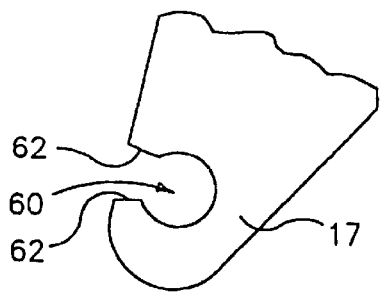
FIG. 7B is an enlarged, fragmentarily-illustrated view of a semi-annular hinge of an inner member of the two-piece cover.
Figure 7C:
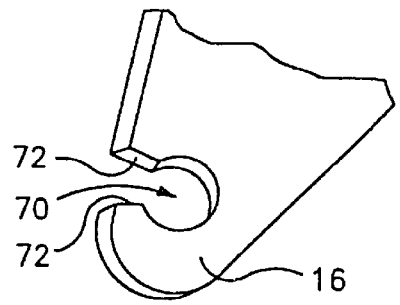
FIG. 7C is an enlarged, fragmentarily-illustrated view of a semi-annular hinge of an outer member of the two-piece cover.
Figure 7D:
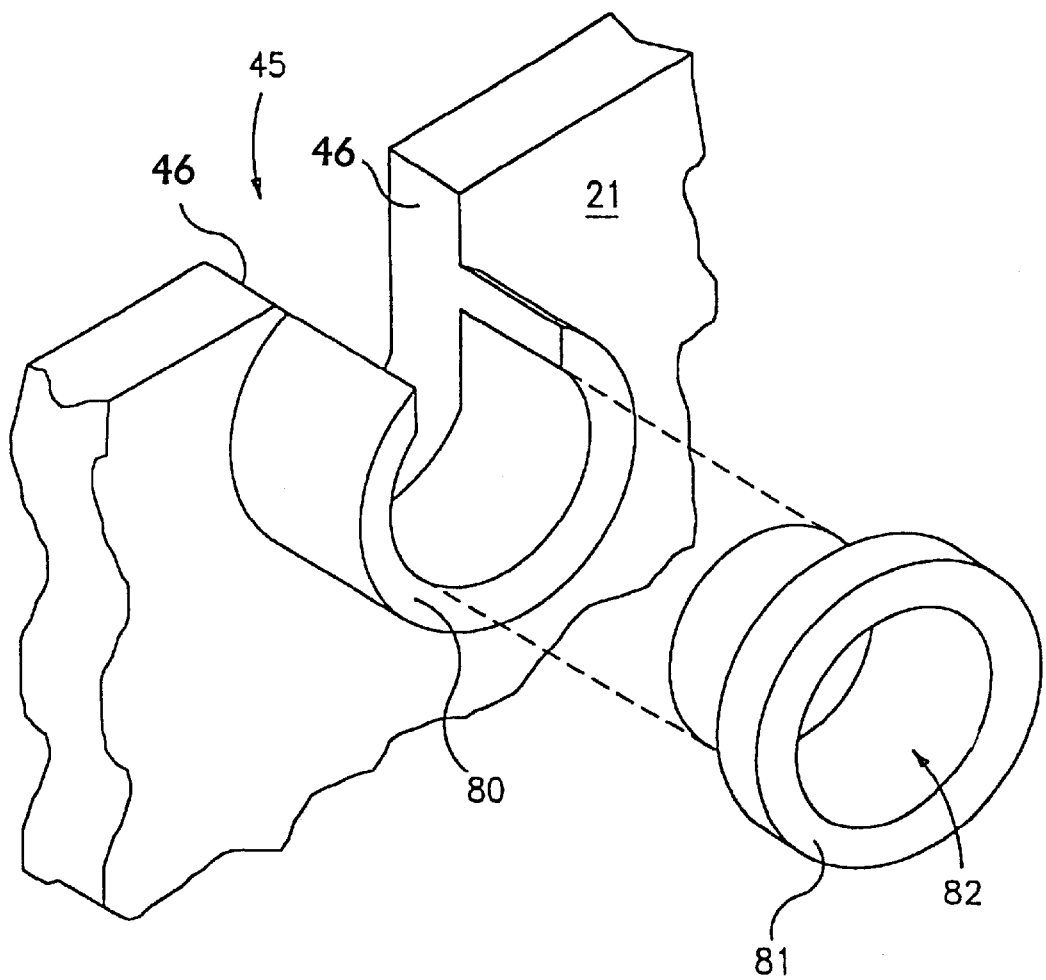
FIG. 7D is an enlarged, perspective view of a post and screw cap for supporting the two-piece cover of FIGS. 7B and 7C.

As best seen in FIGS. 7A and 7C, cover 14 includes a generally triangular inner cover member 17 and a generally triangular outer cover member 16 which are each hingedly attached to ends 19 and 21 of housing 12 between post 80 and screw cap 81. More particularly, the vertex ends of each member 16 and 17 includes a key-like cut-out 70, 60 which semi-encircles post 80 to permit free rotational movement of each cover member 16 and 17 about post 80. Preferably, each key-like cut-out 70, 60 includes a pair of opposing edges 72, 62, respectively, which are generally chamfered or beveled to facilitate insertion of each post within the key-like cut-out 60 to simplify assembly of the rotisserie grill 10.

Figure 5:
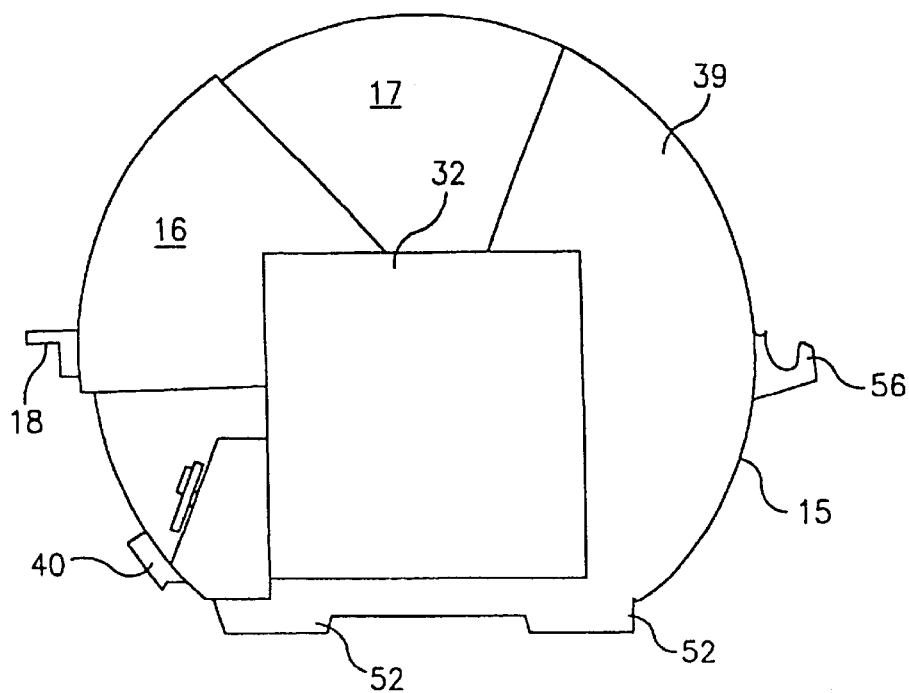
FIG. 5 is side view of the convertible rotisserie and grill of FIG. 2 shown with the two-piece cover closed.
Figure 6:
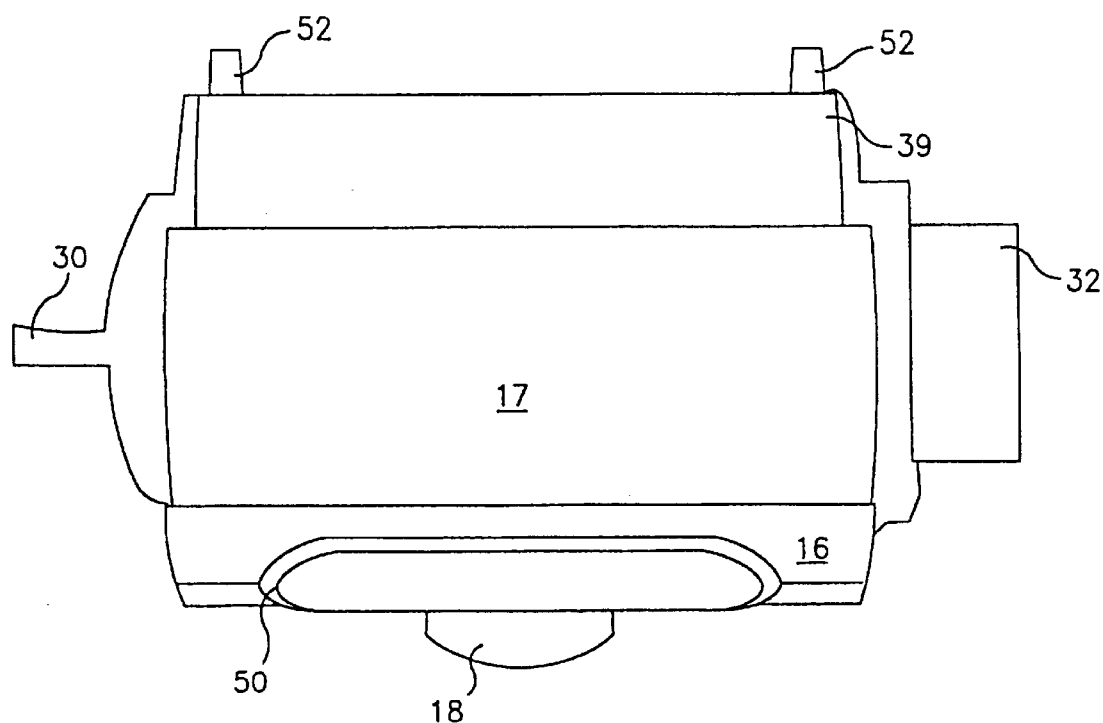
FIG. 6 is a top view of the convertible rotisserie and grill of FIG. 2 shown with the two-piece cover closed.

It is envisioned that the outer cover member 16 is dimensioned to be slightly larger than the inner cover member 17 such that outer member 16 is interleaved with inner member 17 and can freely slide atop inner member 17 during opening and closing of the cover 14 (see FIGS. 5 and 7A). Moreover, inner member 17 preferably includes a lip 69 to which engages the rear inner edge (not shown) of outer member 16 to initiate forward movement of the inner member 17 to facilitate closing of the cover 14. In addition, outer cover member 16 preferably includes a handle 18 to facilitate opening and closing of the entire cover 14. The back plate 15 of housing 12 preferably includes a flange 56 for supporting cover 14 when disposed in the open configuration. The cover 14 can also be equipped with a cooking window 54 for viewing the food during rotisserie or grill-style cooking, As best seen in FIGS. 1 and 8, one of the side plates, e.g., 21, preferably includes a rotisserie control jack 95 which mechanically and electrically couples to the temperature control probe 100 for activating and controlling the temperature of a pair of rotisserie heating rods 90 laterally disposed within the cooking pit proximate the back plate 15 and the spit 30. Jack 95 is generally rectangular and hollow so as to define a socket 97 for snugly receiving probe 100 and includes a pair of prongs 96 which mechanically and electrically reciprocate a complimentary pair of apertures 102 defined within probe 100.

As can be appreciated from the present disclosure, the convertible rotisserie and grill allows a user to readily and safely interchange between grill-style cooking and rotisserie-style cooking.

From the foregoing and with reference to the various figure drawings, those skilled in the art will appreciate that certain modifications can also be made to the present disclosure without departing from the scope of the present disclosure. For example, it is contemplated that the inner facing surfaces of the back panel 15, the two opposing side panels 19 and 21 and the front face 13 can be equipped with a heat-reflective surface which will improve cooking capacity and reduce energy consumption. It is also contemplated that a single arcuate heating panel can be utilized in lieu of heating rods 90 to possibly improve the cooking characteristics of the rotisserie grill 10.

Although the drawings show the rotisserie grill as generally tubular in shape, it is contemplated that the rotisserie grill 10 can be manufactured in other shapes, e.g., round, rectangular and/or polygonal.

There have been described and illustrated herein several embodiments of a convertible rotisserie and grill which includes separate heating elements for grill-style cooking and rotisserie-style cooking. While particular embodiments of the disclosure have been described, it is not intended that the disclosure be limited thereto, as it is intended that the disclosure be as broad in scope as the art will allow and that the specification be read likewise. Therefore, the above description should not be construed as limiting, but merely as exemplifications of preferred embodiments. Those skilled in the art will envision other modifications within the scope and spirit of the claims appended hereto.

What is claimed is:

1. A convertible rotisserie and grill, comprising:
   a housing;
   a grill plate selectively mounted to the housing through a first mechanical interface;
   a spit selectively mounted to the housing through a second mechanical interface
   a first heating element for heating said grill plate;
   a second heating element for heating an area in close proximity to said spit; and
   a probe for interchangeably activating and controlling the temperature of one of said heating elements.

2. A convertible rotisserie and grill according to claim 1 wherein said spit is adapted for rotational movement.

3. A convertible rotisserie and grill according to claim 2 further comprising means for rotating said spit.

4. A convertible rotisserie and grill according to claim 3 wherein said rotating means include a variable-speed motor.

5. A convertible rotisserie and grill according to claim 4 wherein said housing further comprises a step for supporting said motor.

6. A convertible rotisserie and grill according to claim 1 further comprising a cover which removably engages said housing.

7. A convertible rotisserie and grill according to claim 6 wherein said cover is multi-positionable.

8. A convertible rotisserie and grill according to claim 6 further comprising a window disposed within said cover.

9. A convertible rotisserie and grill according to claim 6 wherein said cover includes an inner cover member and an outer cover member which are interleaved with each another.

10. A convertible rotisserie and grill according to claim 1 further comprising a drip pan which removably engages said housing.

11. A convertible rotisserie and grill according to claim 1 wherein said grill plate further comprises a jack for supporting said probe.

12. A convertible rotisserie and grill according to claim 11 wherein said housing includes a recess for supporting said jack.

13. A convertible rotisserie and grill according to claim 1 wherein said housing further comprises a jack for supporting said probe.

14. A convertible rotisserie and grill according to claim 1 wherein said housing includes a pair of opposing recesses for supporting said spit.

15. A convertible rotisserie and grill according to claim 1 wherein said housing includes a recess for supporting a jack.

16. A convertible rotisserie and grill, comprising:
    a housing;
    a grill plate selectively mounted to the housing through a first mechanical interface, wherein said grill plate includes a jack for supporting a probe therein;
    a spit selectively mounted to the housing through a second mechanical interface
    a first heating element for heating said grill plate;
    a second heating element for heating an area in close proximity to said spit,
    wherein said probe interchangeably activates and controls a temperature of one of said heating elements.

17. A convertible rotisserie and grill according to claim 16 wherein said housing includes a recess for supporting said jack.

18. A convertible rotisserie and grill, comprising:
    a housing including a jack for supporting a probe therein;
    a grill plate selectively mounted to the housing through a first mechanical interface;
    a spit selectively mounted to the housing through a second mechanical interface
    a first heating element for heating said grill plate;
    a second heating element for heating an area in close proximity to said spit.

* * * * *